(12) United States Patent
Medwick et al.

(10) Patent No.: US 8,728,634 B2
(45) Date of Patent: May 20, 2014

(54) APPLIANCE TRANSPARENCY

(75) Inventors: Paul A. Medwick, Glenshaw, PA (US);
James P. Thiel, Pittsburgh, PA (US);
Andrew V. Wagner, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 149 days.

(21) Appl. No.: 12/134,262

(22) Filed: Jun. 6, 2008

(65) Prior Publication Data
US 2009/0142602 A1    Jun. 4, 2009

Related U.S. Application Data

(60) Provisional application No. 60/943,718, filed on Jun. 13, 2007.

(51) Int. Cl.
*B32B 17/06* (2006.01)
*B32B 15/04* (2006.01)

(52) U.S. Cl.
USPC ........... 428/701; 428/426; 428/428; 428/432; 428/446; 428/699; 428/702

(58) Field of Classification Search
USPC ......... 428/432, 544, 426, 428, 446, 699, 701, 428/702
See application file for complete search history.

(56) References Cited

U.S. PATENT DOCUMENTS

| | | | |
|---|---|---|---|
| 4,206,252 A * | 6/1980 | Gordon | 427/160 |
| 4,379,040 A | 4/1983 | Gillery | 204/192 P |
| 4,440,822 A * | 4/1984 | Gordon | 428/216 |
| 4,746,347 A | 5/1988 | Sensi | 65/94 |
| 4,792,536 A | 12/1988 | Pecoraro et al. | 501/70 |
| 4,861,669 A | 8/1989 | Gillery | 428/434 |
| 4,898,789 A | 2/1990 | Finley | 428/623 |
| 4,898,790 A | 2/1990 | Finley | 426/623 |
| 4,900,633 A | 2/1990 | Gillery | 428/432 |
| 4,920,006 A | 4/1990 | Gillery | 428/432 |
| 4,938,857 A | 7/1990 | Gillery | 204/192.27 |
| 5,030,593 A | 7/1991 | Heithoff | 501/72 |
| 5,030,594 A | 7/1991 | Heithoff | 501/72 |
| 5,240,886 A | 8/1993 | Gulotta et al. | 501/70 |
| 5,328,768 A | 7/1994 | Goodwin | 428/428 |

(Continued)

FOREIGN PATENT DOCUMENTS

| | | |
|---|---|---|
| AU | 766773 | 5/2001 |
| EP | 0611733 A2 | 8/1994 |

(Continued)

OTHER PUBLICATIONS

International Search Report, dated Sep. 10, 2008 corresponding to International Application No. PCT/US2008/066479.

(Continued)

*Primary Examiner* — David Sample
*Assistant Examiner* — Lauren Colgan
(74) *Attorney, Agent, or Firm* — Andrew C. Siminerio

(57) ABSTRACT

A transparency includes a substrate having a first major surface and a second major surface. A first coating is provided over at least a portion of the first major surface, the first coating including one or more metal oxide layers. A second coating is provided over at least a portion of the second major surface, the second coating including one or more metallic layers.

6 Claims, 1 Drawing Sheet

(56) References Cited

U.S. PATENT DOCUMENTS

| | | | |
|---|---|---|---|
| 5,356,718 A * | 10/1994 | Athey et al. | 428/428 |
| 5,385,872 A | 1/1995 | Gulotta et al. | 501/71 |
| 5,393,593 A | 2/1995 | Gulotta et al. | 428/220 |
| 5,395,698 A * | 3/1995 | Neuman et al. | 428/428 |
| 5,492,750 A | 2/1996 | Shumaker, Jr. et al. | 428/192 |
| 5,792,559 A | 8/1998 | Heithoff et al. | 428/437 |
| 5,811,191 A * | 9/1998 | Neuman | 428/427 |
| 5,821,001 A | 10/1998 | Arbab et al. | 428/623 |
| 6,436,541 B1 | 8/2002 | Sopko et al. | 428/432 |
| 6,869,644 B2 | 3/2005 | Buhay et al. | 427/419.2 |
| 6,916,542 B2 | 7/2005 | Buhay et al. | 428/432 |
| 6,962,759 B2 | 11/2005 | Buhay et al. | 428/699 |
| 7,311,961 B2 | 12/2007 | Finley et al. | 428/212 |
| 2002/0172775 A1 | 11/2002 | Buhay et al. | 427/376.2 |
| 2003/0228476 A1 | 12/2003 | Buhay et al. | 428/469 |
| 2004/0253471 A1 * | 12/2004 | Thiel et al. | 428/544 |

FOREIGN PATENT DOCUMENTS

| | | |
|---|---|---|
| EP | 1293726 A2 | 3/2003 |
| RU | 2124483 C1 | 1/1999 |
| WO | 0055102 A2 | 9/2000 |
| WO | 03004127 A1 | 1/2003 |
| WO | 2004108618 A2 | 12/2004 |
| WO | 2005108064 A2 | 11/2005 |
| WO | WO2007/124291 A2 | 11/2007 |

OTHER PUBLICATIONS

U.S. Appl. No. 10/364,089, filed Feb. 11, 2003, James J. Finley et al.

* cited by examiner

APPLIANCE TRANSPARENCY

CROSS-REFERENCE TO RELATED APPLICATION

This application claims priority to U.S. Provisional Application Ser. No. 60/943,718 filed Jun. 13, 2007, herein incorporated by reference in its entirety.

BACKGROUND OF THE INVENTION

1. Field of the Invention

This invention relates generally to appliance transparencies, such as but not limited to, windows for conventional ovens, microwave ovens, convection-microwave ovens, self-cleaning ovens, refrigerators, furnaces and the like, through which material inside the appliance can be viewed.

2. Technical Considerations

Appliances, such as conventional ovens, microwave ovens, convection-microwave ovens, self-cleaning ovens, refrigerators, and furnaces, just to name a few, often have a transparency through which material inside the appliance can be viewed. These appliance transparencies have sufficient visible light transmittance such that material inside the appliance can be viewed but also have heat or radiation reflecting elements to reduce heat or radiation passing through the transparency.

For example, some conventional oven doors have a transparency formed by two or more spaced glass sheets. The sheets have heat reflective coatings on both their inner and outer surfaces to reduce heat from the interior of the oven escaping into the ambient atmosphere. One widely used heat reflective coating for this purpose is a fluorine-doped tin oxide coating. This fluorine-doped tin oxide coating is typically applied to the glass sheets by spray pyrolysis. While adequate for heat reflection, this conventional appliance transparency structure does have some drawbacks. For example, spray pyrolysis of the fluorine-doped tin oxide coatings can result in uneven coating thickness across the surface of the sheet. This uneven coating thickness can lead to color and reflectance variations in the coated sheet that can be aesthetically undesirable. Additionally, this conventional oven transparency structure requires the application of four separate coatings (one coating on each side of the two sheets). Moreover, this construction requires multiple glass sheets.

Conventional microwave oven doors are typically formed by an inner polymeric panel, such as a Mylar sheet, an intermediate wire mesh grid or screen, and an outer glass sheet. The inner Mylar panel provides ease of cleaning and the intermediate wire mesh screen prevents microwave radiation from the interior of the oven passing through the transparency. Again, while adequate for its intended purposes, this conventional microwave oven door structure does have some drawbacks. For example, the conventional microwave oven door requires three separate pieces that must be assembled in order for the door to function properly. Moreover, it may be difficult to adequately view material inside the oven through the wire mesh screen.

Therefore, it would be advantageous to provide a coated sheet or panel that can be utilized in appliance transparencies that reduces or eliminates at least some of the drawbacks described above. For example, it would be advantageous to provide a conventional oven door in which fewer than four coatings were needed to provide acceptable performance. Additionally, it would be advantageous to provide a microwave oven transparency that eliminates at least some of the required components of conventional microwave oven transparencies and/or provides increased visibility through the microwave oven transparency.

SUMMARY OF THE INVENTION

A transparency includes a substrate having a first major surface and a second major surface. A first coating is provided over at least a portion of the first major surface, the first coating including one or more metal oxide layers. In one non-limiting embodiment, the first coating is free of metallic (i.e. metal) layers. A second coating is provided over at least a portion of the second major surface, the second coating including one or more metallic layers. A protective coating is provided over at least a portion of the second coating.

An oven transparency comprises a glass substrate having a first major surface and a second major surface. A first coating is provided over at least a portion of the first major surface. The first coating comprises fluorine doped tin oxide. In one non-limiting embodiment, the first coating comprises a first coating layer comprising a gradient layer comprising silica and tin oxide and a second coating layer comprising fluorine doped tin oxide. A second coating is provided over at least a portion of the second major surface. The second coating comprises a first dielectric layer comprising a zinc stannate layer and a zinc oxide layer; a first metallic layer over the first dielectric layer; a second dielectric layer over the first metallic layer and comprising a zinc oxide layer, a zinc stannate layer, and another zinc oxide layer; a second metallic layer over the second dielectric layer; and a topcoat over at least a portion of the second metallic layer and comprising at least one of a zinc oxide layer or a zinc oxide layer and a zinc stannate layer. A protective coating is provided over the second coating, e.g., over the topcoat. In one non-limiting embodiment, the protective coating can comprise 15 wt. % to 70 wt. % alumina and 85 wt. % to 30 wt. % silica. In another non-limiting embodiment, the protective coating comprises a first layer and a second layer formed over the first layer, wherein the first layer comprises 50 wt. % to 100 wt. % alumina and 50 wt. % to 0 wt. % silica, and the second layer comprises a mixture of silica and alumina.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
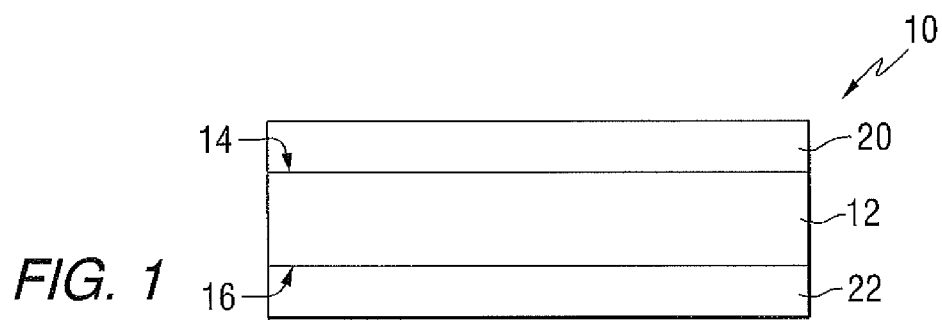
FIG. 1 is side, sectional view (not to scale) of a coated article of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. The terms "microwave region" or "microwave radiation" refer to electromagnetic radiation having a frequency in the range of 300 megahertz to 300 gigahertz. Additionally, all documents, such as but not limited to issued patents and patent applications, referred to herein are to be considered to be "incorporated by reference" in their entirety. In the following discussion, the refractive index values are those for a reference wavelength of 550 nanometers (nm). The term "film" refers to a region of a coating having a desired or selected composition. A "layer" comprises one or more "films". A "coating" or "coating stack" is comprised of one or more "layers". The absolute value of a number "N" is written herein as |N|. By "absolute value" is meant the numerical value of a real number without regard to its sign.

For purposes of the following discussion, the invention will be described with reference to use with an appliance transparency, in particular an oven door window. However, it is to be understood that the invention is not limited to use with appliance transparencies but could be practiced in any desired field, such as but not limited to laminated or non-laminated residential and/or commercial windows, insulating glass units, and/or transparencies for land, air, space, above water and under water vehicles, e.g., automotive windshields, sidelights, back lights, sunroofs, and moon roofs, just to name a few. Therefore, it is to be understood that the specifically disclosed exemplary embodiments are presented simply to explain the general concepts of the invention and that the invention is not limited to these specific exemplary embodiments. Additionally, while a typical appliance "transparency" can have sufficient visible light transmittance such that materials can be viewed through the transparency, in the practice of the invention, the "transparency" need not be transparent to visible light but may be translucent or opaque. The invention can be utilized in making laminated or non-laminated, e.g., single ply or monolithic, articles. By "monolithic" is meant having a single structural substrate or primary ply, e.g., a glass ply. By "primary ply" is meant a primary support or structural member.

A non-limiting appliance transparency 10 incorporating features of the invention is illustrated in FIG. 1. The transparency 10 can have any desired visible light, infrared radiation, or ultraviolet radiation transmission and reflection. For example, the transparency 10 can have a visible light transmission of any desired amount, e.g., greater than 0% up to 100%. In one non-limiting embodiment, the visible light transmission at a reference wavelength of 550 nm can be up to 90%, such as up to 80%, such as up to 70%, such as up to 60%, such as up to 50%, such as up to 40%, such as up to 30%, such as up to 20%.

As best seen in FIG. 1, the transparency 10 includes a panel or substrate 12 having a first major surface 14 and an opposed or second major surface 16. A first heat and/or radiation reflecting coating 20 is formed over at least a portion of the first major surface 14 and a second heat and/or radiation reflecting coating 22 is formed over at least a portion of the second major surface 16. The first coating 20 and the second coating 22 can be the same or different and can be applied by the same or different methods. In one non-limiting embodiment, the first coating 20 is a chemical deposition coating, such as a chemical vapor deposition (CVD) coating. The second coating 22 can be a physical deposition coating, such as a magnetron sputtered vapor deposition (MSVD) coating.

In the broad practice of the invention, the substrate 12 can include any desired material having any desired characteristics. For example, the substrate 12 can be transparent or translucent to visible light. By "transparent" is meant having visible light transmission of greater than 0% to 100%. For example, the substrate 12 can have a visible light transmission at 550 nm up to 90%, such as up to 85%, such as up to 80%, such as up to 70%, such as up to 60%, such as up to 50%, such as up to 30%, such as up to 20%. Alternatively, the substrate 12 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the substrate 12 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat.

Nos. 4,466,562 and 4,671,155. The substrate 12 can be, for example, clear float glass or can be tinted or colored glass. Although not limiting to the invention, examples of glass suitable for the substrate are described in U.S. Pat. Nos. 4,746,347; 4,792,536; 5,030,593; 5,030,594; 5,240,886; 5,385,872; and 5,393,593. Non-limiting examples of glass that can be used for the practice of the invention include Solargreen®, Solextra®, GL-20®, GL-35™, Solarbronze®, Starphire® and Solargray® glass, all commercially available from PPG Industries Inc. of Pittsburgh, Pa.

The substrate 12 can be of any desired dimensions, e.g., length, width, shape, or thickness. In one non-limiting embodiment, the substrate 12 can have a thickness in the range of 1 mm to 10 mm, such as 1 mm to 5 mm, such as 2 mm to 4 mm, such as 3 mm to 4 mm, such as 3.2 mm.

In one non-limiting embodiment, the substrate 12 can have a high visible light transmission at a reference wavelength of 550 nanometers (nm). By "high visible light transmission" is meant visible light transmission at 550 nm of greater than or equal to 85%, such as greater than or equal to 87%, such as greater than or equal to 90%, such as greater than or equal to 91%, such as greater than or equal to 92%, at a thickness of 5.5 mm.

The first coating 20 and the second coating 22 can be deposited over the substrate 12 (panel) by any conventional method, such as but not limited to conventional chemical vapor deposition (CVD) and/or physical vapor deposition (PVD) methods. Examples of CVD processes include spray pyrolysis, chemical vapor deposition (CVD), and sol-gel deposition. Examples of PVD processes include electron beam evaporation and vacuum sputtering (such as magnetron sputter vapor deposition (MSVD)). In one non-limiting embodiment, the first coating 20 can be deposited by CVD and the second coating 22 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

In one non-limiting embodiment, the first coating 20 can be a heat and/or radiation reflecting coating and can have one or more functional coating layers or films of the same or different composition and/or functionality. For example, the first coating 20 can be a single layer coating or a multi-layer coating and can include one or more metals, non-metals, semi-metals, semiconductors, and/or alloys, compounds, compositions, combinations, or blends thereof. For example, the first coating 20 can be a single layer metal oxide coating, a multiple layer metal oxide coating, a non-metal oxide coating, a metallic nitride or oxynitride coating, a non-metallic nitride or oxynitride coating, a multiple layer coating comprising one or more of any of the above materials, or one or more of the layers can comprise a mixture of two or more of the above materials. In one non-limiting embodiment, the first coating 20 can be a doped metal oxide coating, such as a fluorine-doped tin oxide coating, e.g. a NESA® coating commercially available from PPG Industries, Inc of Pittsburgh, Pa. In one non-limiting embodiment, the first coating can be free of metallic layers.

Figure 2:
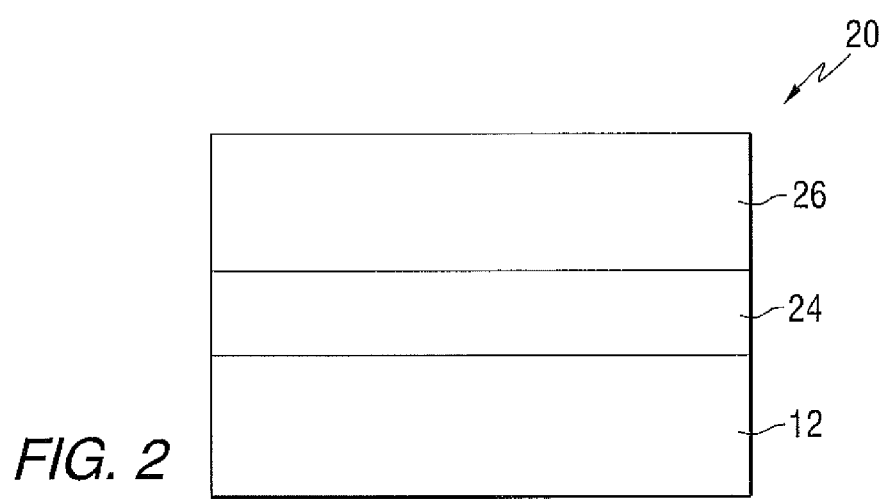
FIG. 2 is a side view (not to scale) of an exemplary first coating for use with the invention.

As shown in the non-limiting embodiment of FIG. 2, the first coating 20 can comprise one, two or more coating layers. In the illustrated non-limiting embodiment, the first coating 20 comprises a first coating region or layer 24 and a second coating region or layer 26.

The first coating layer 24 can include one or more metal oxide materials, such as one or more oxides of one or more of Zn, Fe, Mn, Al, P, Ce, Sn, Sb, Hf, Zr, Ni, Zn, Bi, Ti, Co, Cr, Si or In or an alloy, such as zinc stannate, of any thereof. The first coating layer 24 can also include one or more dopant materials, such as but not limited to Sn, F, In, or Sb.

The first coating layer 24 can be a homogeneous layer, or can comprise a plurality of coating films, or can be a gradient layer. By "gradient layer" is meant a layer having two or more components, in which the concentration of the components continually changes as the distance from the substrate 12 changes.

In one non-limiting embodiment, the first coating layer 24 comprises a gradient layer having a mixture of two or more metal oxide materials. In one particular non-limiting embodiment, the first layer 24 comprises a mixture of silicon dioxide and a metal oxide, such as tin oxide, with a continuously changing composition as the distance from the glass-coating interface increases. Generally, near the glass-coating interface, the first layer 24 is predominantly silicon dioxide, while at the opposite surface of the first layer 24, i.e. the coating surface farthest from the glass-coating interface, the composition of the first layer 24 is predominantly tin oxide. Although the first layer 24 is discussed using a mixture of tin oxide and silicon oxide, the invention is not limited thereto. Any two or more compounds may be used in the practice of the invention. A suitable method of making such a gradient layer is disclosed in U.S. Pat. No. 5,356,718.

In one non-limiting embodiment, the first layer 24 is a gradient layer of silica and tin oxide having a thickness in the range of 100 Å to 10,000 Å, such as 100 Å to 5,000 Å, such as 500 Å to 5,000 Å, such as 500 Å to 4,000 Å, such as 500 Å to 3,000 Å, such as 500 Å to 2,000 Å, such as 1,000 Å to 2,000 Å, such as 1,000 Å to 1,500 Å, such as 1200 Å.

The second layer 26 can be a metal oxide layer, such as a doped metal oxide layer. For example, the second layer 26 can include one or more metal oxide materials, such as one or more oxides of one or more of Zn, Fe, Mn, Al, Ce, Sn, Sb, Hf, Zr, Ni, Zn, Bi, Ti, Co, Cr, Si or In or an alloy, such as zinc stannate. The second layer 26 can also include one or more dopant materials, such as but not limited to Sn, F, In, Al, or Sb.

In one non-limiting embodiment, the second layer 26 is a fluorine doped tin oxide layer, with the fluorine present in the precursor materials in an amount less than 20 weight percent based on the total weight of the precursor materials, such as less than 15 weight percent, such as less than 13 weight percent, such as less than 10 weight percent, such as less than 5 weight percent. The second layer 26 can be amorphous, crystalline or substantially crystalline.

In one non-limiting embodiment, the second layer 26 can have a thickness in the range of 100 Å to 10,000 Å, such as 100 Å to 8,000 Å, such as 100 Å to 6,000 Å, such as 100 Å to 5,000 Å, such as 500 Å to 5,000 Å, such as 500 Å to 4,500 Å, such as 1,000 Å to 4,500 Å, such as 1,000 Å to 4,000 Å, such as 2,000 Å to 4,000 Å, such as 3,000 Å to 4,000 Å, such as 3,100 Å.

The first coating 20 can have any desired overall thickness. In one non-limiting example, the first coating 20 can have a thickness in the range of greater than 0 Å to 10,000 Å, such as 100 Å to 8,000 Å, such as 200 Å to 6,000 Å, such as 300 Å to 5,000 Å, such as 500 Å to 5,000 Å, such as 1,000 Å to 5,000 Å, such as 2000 Å to 5000 Å, such as 3000 Å to 5000 Å, such as 4000 Å to 5000 Å, such as 4300 Å.

An example of one suitable coating for use as the first coating 20 is SUNGATE® 500 coating, which is a multilayered transparent conductive oxide coating commercially available from PPG Industries, Inc of Pittsburgh, Pa. and described in further detail in U.S. Pat. No. 6,436,541. Other suitable coatings are commercially available from PPG Industries, Inc. under the SUNGATE® and SOLARBAN® families of coatings.

In another non-limiting embodiment, the first coating 20 can be a single layer coating, such as a fluorine doped tin oxide coating, having a thickness in the range of greater than 0 Å to 10,000 Å, such as 100 Å to 8,000 Å, such as 200 Å to 6,000 Å, such as 300 Å to 5,000 Å, such as 500 Å to 5,000 Å, such as 1,000 Å to 5,000 Å, such as 2000 Å to 5000 Å, such as 3000 Å to 5000 Å, such as 4000 Å to 5000 Å, such as 4300 Å.

Figure 3:
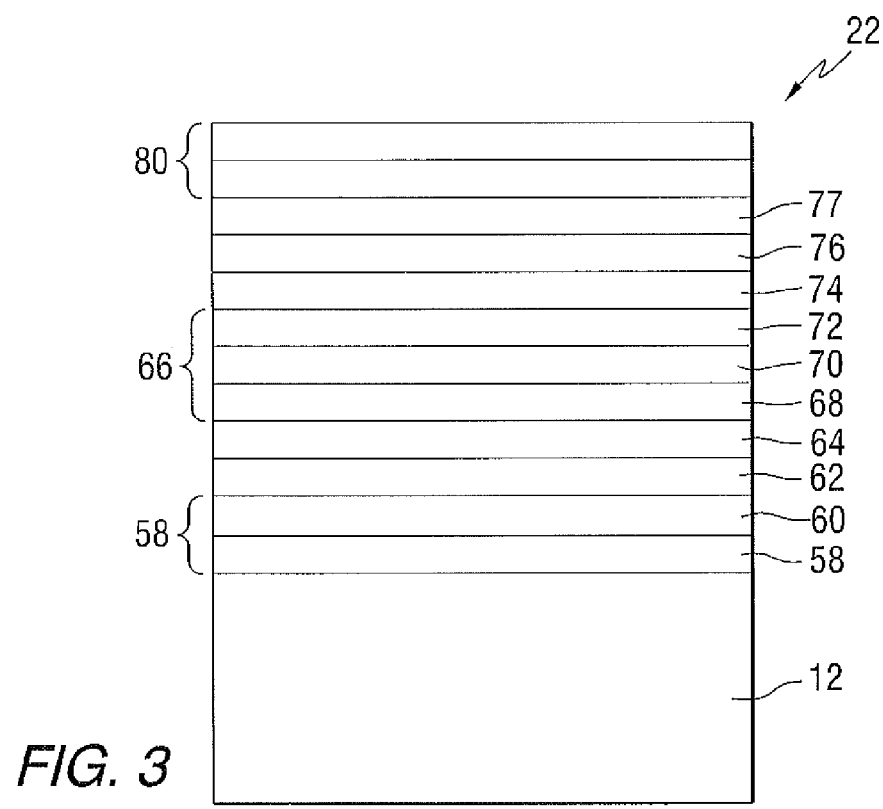
FIG. 3 is a side view (not to scale) of an exemplary second coating for use with the invention.

As shown in FIG. 3 and contrary to conventional oven door transparencies, the second coating 22 can include one, two or more heat and/or radiation reflective metal layers or films comprising a reflective metal, e.g., a noble metal such as but not limited to gold, copper, or silver, or combinations or alloys thereof. The second coating 22 can also include one or more anti-reflective and/or dielectric coating materials, such as metal oxides or oxides of metal alloys.

An exemplary second coating 22 is shown in FIG. 3. The illustrated exemplary second coating 22 includes a base layer or first dielectric layer 56 deposited over at least a portion of the second major surface 16 of the substrate 12. The first dielectric layer 56 can comprise one or more films of anti-reflective materials and/or dielectric materials, such as but not limited to metal oxides, oxides of metal alloys, nitrides, oxynitrides, or mixtures thereof. The first dielectric layer 56 can be transparent to visible light. Examples of suitable metal oxides for the first dielectric layer 56 include oxides of titanium, hafnium, zirconium, niobium, zinc, bismuth, lead, indium, tin, and mixtures thereof. These metal oxides can have small amounts of other materials, such as manganese in bismuth oxide, indium in tin oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 56 can be a substantially single phase film, such as a metal alloy oxide film, e.g., zinc stannate, or can be a mixture of phases composed of zinc and tin oxides or can be composed of a plurality of metal oxide films, such as those disclosed in U.S. Pat. Nos. 5,821,001; 4,898,789; and 4,898,790.

In the illustrated exemplary embodiment, the first dielectric layer 56 can comprise a multi-film structure having a first metal oxide or metal alloy oxide film 58 deposited over at least a portion of the major surface of the substrate 12 and a second metal oxide film 60 deposited over the first metal alloy oxide film 58. In one embodiment, the first dielectric layer 56 can have a total thickness of less than or equal to 1,000 Å, such as less than or equal to 500 Å, e.g., less than or equal to 300 Å, e.g., less than or equal to 280 Å. For example, the first dielectric layer 56 can have a total thickness in the range of 50 Å to 1,000 Å, such as 50 Å to 800 Å, such as 50 Å to 500 Å, such as 50 Å to 400 Å, such as 100 Å to 300 Å, such as 200 Å to 300 Å, such as 246 Å.

For example, the metal alloy oxide-containing film 58 can have a thickness in the range of 100 Å to 500 Å, such as 100 Å to 400 Å, e.g., 100 Å to 300 Å, such as 100 Å to 200 Å, such as 188 Å.

The metal oxide film 60 can have a thickness in the range of 10 Å to 500 Å, such as 10 Å to 400 Å, such as 10 Å to 200 Å, such as 10 Å to 100 Å, such as 20 Å to 80 Å, such as 30 Å to 60 Å, such as 50 Å to 60 Å, such as 58 Å.

In one embodiment, the film 58 can have a majority of a zinc/tin alloy oxide or a mixture of zinc and tin oxides. The zinc/tin alloy oxide can be that obtained from magnetron sputtering vacuum deposition from a cathode of zinc and tin that can comprise zinc and tin in proportions of 10 wt. % to 90 wt. % zinc and 90 wt. % to 10 wt. % tin. One suitable metal alloy oxide that can be present in the film is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to 0.9. For example where x=⅔ Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film.

The metal oxide film 60 can be a zinc-containing film, such as zinc oxide. The zinc oxide film can include other materials to improve the sputtering characteristics of the associated cathode, e.g., the zinc oxide can contain 0 to 20 wt. % tin, e.g., 0 to 15 wt. % tin, e.g., 0 to 10 wt. % tin.

A first heat and/or radiation reflective film or layer 62 can be deposited over the first dielectric layer 56. The first reflective layer 62 can include a reflective metal, such as but not limited to metallic gold, copper, silver, or mixtures, alloys, or combinations thereof. The first reflective layer 62 can have a thickness in the range of 25 Å to 300 Å, e.g., 50 Å to 300 Å, e.g., 50 Å to 150 Å, such as 70 Å to 110 Å, such as 75 Å to 100 Å, such as 70 Å to 90 Å, such as 80 Å. In one embodiment, the first reflective layer 62 comprises a metallic silver layer.

A first primer film 64 can be deposited over the first reflective layer 62. The first primer film 64 can be an oxygen capturing material, such as titanium, that can be sacrificial during the deposition process to prevent degradation or oxidation of the first reflective layer 62 during a sputtering process. The oxygen capturing material can be chosen to oxidize before the material of the first reflective layer 62. In one embodiment, the first primer film 64 can have a thickness in the range of 5 Å to 50 Å, e.g., 10 Å to 40 Å, such as 20 Å to 40 Å, such as 36 Å. In another embodiment the thickness can be in the range of 12 Å to 20 Å.

An optional second dielectric layer 66 can be deposited over the first reflective layer 62 (e.g., over the first primer film 64). The second dielectric layer 66 can comprise one or more metal oxide or metal alloy oxide-containing films, such as those described above with respect to the first dielectric layer 56. In the illustrated embodiment, the second dielectric layer 66 includes a first metal oxide layer 68, e.g., zinc oxide, deposited over the first primer film 64. A second metal alloy oxide layer 70, e.g., a zinc stannate layer, can be deposited over the first zinc oxide layer 68. A third metal oxide layer 72, e.g., another zinc oxide layer, can be deposited over the zinc stannate layer 70 to form the multi-film layer 66.

The first metal oxide layer 68 of the second dielectric layer 66 can have a thickness in the range of 10 Å to 200 Å, such as 20 Å to 200 Å, such as 30 Å to 150 Å, such as 30 Å to 150 Å, such as 30 Å to 70 Å, such as 40 Å to 60 Å, such as 57 Å.

The metal alloy oxide layer 70 can have a thickness in the range of 100 Å to 2,000 Å, such as 100 Å to 1,500 Å, such as 200 Å to 1,500 Å, such as 300 Å to 1,000 Å, such as 400 Å to 800 Å, such as 500 Å to 700 Å, such as 600 Å to 700 Å, such as 680 Å.

The second metal oxide layer 72 of the second dielectric layer 66 can have a thickness in the range of 10 Å to 200 Å, such as 20 Å to 200 Å, such as 30 Å to 150 Å, such as 30 Å to 150 Å, such as 30 Å to 100 Å, such as 40 Å to 100 Å, such as 50 Å to 90 Å, such as 60 Å to 90 Å, such as 70 Å to 90 Å, such as 80 Å to 90 Å, such as 87 Å.

The second dielectric layer 66 can have a total thickness in the range of 100 Å to 10,000 Å, such as 200 Å to 5,000 Å, such as 500 Å to 2,000 Å, such as 500 Å to 1,000 Å, such as 600 Å to 900 Å, such as 824 Å.

An optional second heat and/or radiation reflective layer 74 can be deposited over the second dielectric layer 66. The second reflective layer 74 can include any one or more of the reflective materials described above with respect to the first reflective layer 62. The second reflective layer 74 can have a thickness in the range of 25 Å to 250 Å, such as 25 Å to 200 Å, such as 50 Å to 200 Å, such as 75 Å to 200 Å, such as 80 Å to 200 Å, such as 90 Å to 180 Å, such as 100 Å to 150 Å, such as 110 Å to 150 Å, such as 120 Å to 140 Å, such as 130 Å to 140 Å, such as 135 Å. In a non-limiting embodiment, the second reflective layer 74 includes silver.

An optional second primer film 76 can be deposited over the second reflective layer 74. The second primer film 76 can be any of the materials described above with respect to the first primer film 64. The second primer film 76 can have a thickness in the range of about 5 Å to 50 Å, e.g., 10 Å to 25 Å, e.g., 12 Å to 20 Å, such as 19 Å. In a non-limiting embodiment, the second primer film 76 includes titanium.

In one non-limiting embodiment, a topcoat 77 can be provided over the second reflective layer 74, such as over the second primer film 76. The topcoat can be a metal oxide and/or metal alloy oxide or mixture of metal oxides or a multilayer coating. In one non-limiting embodiment, the topcoat 77 can comprise a zinc oxide layer and/or a zinc stannate layer. In one non-limiting embodiment, the topcoat 77 comprises a zinc oxide layer. The zinc oxide layer can have a thickness in the range of 5 Å to 2000 Å, such as 10 Å to 2000 Å, such as 20 Å to 1500 Å, such as 20 Å to 1300 Å, such as 20 Å to 1000 Å, such as 20 Å to 800 Å, such as 30 Å to 700 Å, such as 30 Å to 600 Å, such as 40 Å to 500 Å, such as 40 Å to 400 Å, such as 40 Å to 300 Å, such as 40 Å to 200 Å, such as 40 Å to 150 Å, such as 40 Å to 100 Å, such as 56 Å. In another non-limiting embodiment, the topcoat 77 comprises a zinc oxide layer as described above and a zinc stannate layer either over or under the zinc oxide layer. In one non-limiting embodiment, the zinc stannate layer can have a thickness in the range of 5 Å to 2000 Å, such as 10 Å to 2000 Å, such as 20 Å to 1500 Å, such as 20 Å to 1300 Å, such as 20 Å to 1000 Å, such as 20 Å to 800 Å, such as 30 Å to 700 Å, such as 30 Å to 600 Å, such as 40 Å to 500 Å, such as 40 Å to 400 Å, such as 40 Å to 300 Å, such as 40 Å to 200 Å, such as 40 Å to 150 Å, such as 40 Å to 100 Å.

A protective overcoat 80 can be deposited over at least a portion of the second coating 22, e.g., over the second reflective layer 74, e.g., over the topcoat 77, to assist in protecting the underlying layers, such as the antireflective layers, from mechanical and chemical attack during processing and/or during the article's service life. The protective coating 80 can be an oxygen barrier coating layer to prevent or reduce the passage of ambient oxygen into the underlying layers of the coating 22, such as during heating or bending. The protective coating 80 can be of any desired material or mixture of materials. In one non-limiting exemplary embodiment, the protective coating 80 can include a layer having one or more metal oxide materials, such as but not limited to oxides of aluminum, silicon, or mixtures thereof. For example, the protective coating 80 can be a single coating layer comprising in the range of 0 wt. % to 100 wt. % alumina and/or 100 wt. % to 0 wt. % silica, or 5 wt. % to 95 wt. % alumina and 95 wt. % to 5 wt. % silica, or 10 wt. % to 90 wt. % alumina and 90 wt. % to 10 wt. % silica, or 15 wt. % to 90 wt. % alumina and 85 wt. % to 10 wt. % silica, or 50 wt. % to 75 wt. % alumina and 50 wt. % to 25 wt. % silica, or 50 wt. % to 70 wt. % alumina and 50 wt. % to 30 wt. % silica, or wt. % to 100 wt. % alumina and 65 wt. % to 0 wt. % silica, or 70 wt. % to 90 wt. % alumina and 30 wt. % to 10 wt. % silica, or 75 wt. % to 85 wt. % alumina and 25 wt. % to 15 wt. % of silica, or 88 wt. % alumina and 12 wt. % silica, or 65 wt. % to 75 wt. % alumina and 35 wt. % to 25 wt. % silica, or 70 wt. % alumina and 30 wt. % silica, or 60 wt. % to less than 75 wt. % alumina and greater than 25 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the protective coating 80. In one non-limiting embodiment, the refractive index of the protective coating 80 can be in the range of 1 to 3, such as 1 to 2, such as 1.4 to 2, such as 1.4 to 1.8.

In one non-limiting embodiment, the protective coating 80 is a combination silica and alumina coating. The protective coating 80 can be sputtered from two cathodes (e.g., one silicon cathode and one aluminum cathode) or from a single cathode containing both silicon and aluminum. This silicon/aluminum oxide protective coating 80 can be written as $Si_xAl_{1-x}O_{1.5+x/2}$, where x can vary from greater than 0 to less than 1.

Alternatively, the protective coating 80 can be a multi-layer coating formed by separately formed layers of metal oxide materials, such as but not limited to a bi-layer formed by one metal oxide-containing layer (e.g., a silica and/or alumina-containing first layer) formed over another metal oxide-containing layer (e.g., a silica and/or alumina-containing second layer). The individual layers of the multi-layer protective coating can be of any desired thickness.

The protective coating 80 can be of any desired thickness. In one non-limiting embodiment, the protective coating 80 is a silicon/aluminum oxide coating ($Si_xAl_{1-x}O_{1.5+x/2}$) having a thickness in the range of 50 Å to 50,000 Å, e.g., 50 Å to 10,000 Å, e.g., 100 Å to 1,000 Å, e.g., 100 Å to 800 Å, e.g., 100 Å to 700 Å, e.g., 200 Å to 600 Å, e.g., 300 Å to 600 Å, e.g., 400 Å to 600 Å, e.g., 500 Å to 600 Å, e.g., 500 Å to 520 Å.

In another non-limiting embodiment, the protective coating 80 can comprise a first layer 82 and a second layer 84 formed over the first layer 82. In one specific non-limiting embodiment, the first layer 82 can comprise alumina or a mixture or alloy comprising alumina and silica. For example, the first layer 82 can comprise at least 5 wt. % alumina, e.g., at least 10 wt. % alumina, or at least 15 wt. % alumina, or at least 30 wt. % alumina, or at least 40 wt. % alumina, or 50 wt. % to 70 wt. % alumina, or 70 wt. % to 100 wt. % alumina and 30 wt. % to 0 wt. % silica. In one non-limiting embodiment, the first layer 82 can have a thickness in the range of greater than 0 Å to 10,000 Å, such as 50 Å to 5,000 Å, such as 50 Å to 2,000 Å, such as 100 Å to 1500 Å, such as 200 Å to 1500 Å, such as 200 Å to 1000 Å, such as 200 Å to 800 Å, such as 200 Å to 600 Å, such as 300 Å to 600 Å, such as 300 Å to 500 Å, such as 300 Å to 400 Å, such as 330 Å.

The second layer 84 can comprise silica or a mixture or alloy comprising silica and alumina. For example, the second layer can comprise at least 40 wt. % silica, e.g., at least 50 wt. % silica, or at least 60 wt. % silica, or at least 70 wt. % silica, or at least 80 wt. % silica, or at least 90 wt. % silica, or 100 wt. % silica, or 75 wt. % to 100 wt. % silica and 0 wt. % to 25 wt. % alumina. In one non-limiting embodiment, the second layer can have a thickness in the range of greater than 0 Å to 10,000 Å, such as 50 Å to 5,000 Å, such as 50 Å to 2,000 Å, such as 50 Å to 1500 Å, such as 75 Å to 1500 Å, such as 100 Å to 1000 Å, such as 100 Å to 800 Å, such as 100 Å to 600 Å, such as 100 Å to 500 Å, such as 100 Å to 400 Å, such as 100 Å to 300 Å, such as 100 Å to 250 Å, such as 100 Å to 200 Å, such as 190 Å.

In one non-limiting embodiment, the protective coating 80 can have a thickness in the range of greater than 0 Å to 10,000 Å, such as 50 Å to 5,000 Å, such as 50 Å to 2,000 Å, such as 100 Å to 1500 Å, such as 200 Å to 1500 Å, such as 300 Å to 1000 Å, such as 400 Å to 800 Å, such as 400 Å to 600 Å, such as 500 Å to 600 Å, such as 520 Å. Non-limiting examples of suitable protective coatings are described, for example, in U.S. patent application Ser. Nos. 10/007,382; 10/133,805; 10/397,001; 10/422,094; 10/422,095; and 10/422,096.

While the above embodiment includes two reflective layers, it is to be understood that the invention is not limited to this configuration. The second coating 22 can include more than two reflective layers, such as three or more reflective layers, such as four or more reflective layers, such as five or more reflective layers. An exemplary such coating is disclosed in U.S. patent application Ser. No. 10/364,089. For example, in another non-limiting embodiment, an optional third dielectric layer can be deposited over the second reflective layer (e.g., over the second primer film). The third dielectric layer can also include one or more metal oxide or metal alloy oxide-containing layers such as discussed above with respect to the first and second dielectric layers. For example, the third dielectric layer can include a first metal oxide layer, e.g., a zinc oxide layer, a second metal alloy oxide-containing layer, e.g., a zinc stannate layer, deposited over the zinc oxide layer, and a third metal oxide layer, e.g., another zinc oxide layer, deposited over the zinc stannate-containing layer. The metal oxide layers can have thicknesses in the range of 50 Å to 200 Å, such as 75 Å to 150 Å, e.g., 100 Å. The metal alloy oxide layer can have a thickness in the range of 100 Å to 500 Å, e.g., 200 Å to 500 Å, e.g., 300 Å to 500 Å, e.g., 400 Å.

An optional third heat and/or radiation reflective layer can be deposited over the third dielectric layer. The third reflective layer can be of any of the materials discussed above with respect to the first and second reflective layers. The third reflective layer can have a thickness in the range of 50 Å to 100 Å, e.g., 70 Å to go A, e.g., 75 Å to 85 Å.

An optional third primer film can be deposited over the third reflective layer. In one embodiment, the third primer film can be of any of the primer materials described above. The third primer film can have a thickness in the range of 5 Å to 50 Å, e.g., 10 Å to 25 Å, e.g., 12 Å to 20 Å.

An optional fourth dielectric layer can be deposited over the third reflective layer (e.g., over the third primer film). The fourth dielectric layer can be comprised of one or more metal oxide or metal alloy oxide-containing layers, such as those discussed above with respect to the first, second, or third dielectric layers. In one embodiment, the fourth dielectric layer is a multi-film layer having a first metal oxide layer, e.g., a zinc oxide layer, deposited over the third primer film and a second metal alloy oxide layer, e.g., a zinc stannate layer, deposited over the zinc oxide layer. The metal oxide layer can have a thickness in the range of 25 Å to 200 Å, such as 50 Å to 150 Å, such as 100 Å. The metal alloy oxide layer can have a thickness in the range of 25 Å to 500 Å, e.g., 50 Å to 250 Å, e.g., 100 Å to 150 Å.

In this non-limiting embodiment, the protective overcoat 80 could be provided over the third reflective layer, e.g., over the fourth dielectric layer.

The first coating 20 and second coating 22 can provide the transparency 10 with aesthetic characteristics. As will be appreciated by one skilled in the art, the color of an object is highly subjective. Observed color will depend on the lighting conditions and the preferences of the observer. In order to evaluate color on a quantitative basis, several color order systems have been developed. One such method of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as $L^*$, $a^*$ and $b^*$, are calculated from the tristimulus values (X, Y, Z). $L^*$ indicates the lightness or darkness of the color and represents the lightness plane on which the color resides, $a^*$ indicates the position of the color on a red ($+a^*$) green ($-a^*$) axis, and $b^*$ indicates the color position on a yellow ($+b^*$) blue ($-b^*$) axis. When the rectangular coordinates of the CIELAB system are converted into cylindrical polar coordinates, the resulting color system is known as the CIELCH color system which specifies color in terms of lightness ($L^*$), and hue angle ($H°$) and chroma ($C^*$). $L^*$ indicates the lightness or darkness of the color as in the CIELAB system. Chroma, or saturation or intensity, distinguishes color intensity or clarity (i.e. vividness vs. dullness) and is the vector distance from the center of the color space to the measured color. The lower the chroma of the color, i.e. the less its intensity, the closer the color is to being a so-called neutral color. With respect to the CIELAB system, $C^* = (a^{*2} + b^{*2})^{1/2}$. Hue angle distinguishes colors such as red, yellow, green and blue and is a measure of the angle of the vector extending from the $a^*$, $b^*$ coordinates through the center of the CIELCH color space measured counterclockwise from the red ($+a^*$) axis.

It should be appreciated that color may be characterized in any of these color systems and one skilled in the art may calculate equivalent DW and Pe values; $L^*$, $a^*$, $b^*$ values; and $L^*$, $C^*$, $H°$ values from the transmittance curves of the viewed glass or composite transparency. A detailed discussion of color calculations is given in U.S. Pat. No. 5,792,559. In the present document, color is characterized using the CIELAB system ($L^*a^*b^*$). However, it is to be understood that this is simply for ease of discussion and the disclosed colors could be defined by any conventional system, such as those described above.

In one non-limiting embodiment of the invention, the transparency 10 can have a transmitted color of blue or greenish blue.

In one non-limiting embodiment, the first side of the transparency (i.e. the side with the first coating 20) can have a reflected color within the color space defined by $-10 \leq a^* \leq 0$, such as $-9 \leq a^* \leq 0$, such as $-8 \leq a^* \leq 0$, such as $-7 \leq a^* \leq 0$, such as $-6 \leq a^* \leq 0$, such as $-5 \leq a^* \leq 0$, such as $-4 \leq a^* \leq 0$, such as $-3 \leq a^* \leq 0$, such as $-2 \leq a^* \leq 0$, such as $-1 \leq a^* \leq 0$. In one non-limiting embodiment, the first side of the transparency can have a reflected color within the color space defined by $-9 \leq a^* \leq -4$, such as $-8 \leq a^* \leq -4$, such as $-8 \leq a^* \leq -5$, such as $-7 \leq a^* \leq -6$. In another non-limiting embodiment, the first side of the transparency can have a reflected color within the color space defined by $-6 \leq a^* \leq -3$, such as $-5 \leq a^* \leq -4$. In a further non-limiting embodiment, the first side of the transparency can have a reflected color within the color space defined by $-5 \leq a^* \leq +2$, such as $-4 \leq a^* \leq +1$, such as $-4 \leq a^* \leq 0$, such as $-3 \leq a^* \leq -1$, such as $-3 \leq a^* \leq -2$.

In one non-limiting embodiment, the first side of the transparency can have a reflected color within the color space defined by b* in the range of $-40 \leq b^* \leq -2$, such as $-30 \leq b^* \leq -5$, such as $-25 \leq b^* \leq -7$. In one non-limiting embodiment, the first side of the transparency can have a reflected color within the color space defined by $-12 \leq b^* \leq -5$, such as $-11 \leq b^* \leq -6$, such as $-11 \leq b^* \leq -7$, such as $-10 \leq b^* \leq -8$, such as $-10 \leq b^* \leq -9$. In another non-limiting embodiment, the first side of the transparency can have a reflected color within the color space defined by $-16 \leq b^* \leq -10$, such as $-15 \leq b^* \leq -11$, such as $-15 \leq b^* \leq -12$, such as such as $-15 \leq b^* \leq -13$, such as $-14 \leq b^* \leq -13$. In a further non-limiting embodiment, the first side of the transparency can have a reflected color within the color space defined by $-25 \leq b^* \leq -16$, such as $-24 \leq b^* \leq -17$, such as $-23 \leq b^* \leq -18$, such as $-22 \leq b^* \leq -18$, such as $-21 \leq b^* \leq -18$, such as $-21 \leq b^* \leq -18$, such as $-20 \leq b^* \leq -18$, such as $-19 \leq b^* \leq -18$.

In one non-limiting embodiment, the second side of the transparency (i.e. the side with the second coating 22) can have a reflected color within the color space defined by $-10 \leq a^* \leq 0$, such as $-9 \leq a^* \leq 0$, such as $-8 \leq a^* \leq 0$, such as $-7 \leq a^* \leq 0$, such as $-6 \leq a^* \leq 0$, such as $-5 \leq a^* \leq 0$, such as $-4 \leq a^* \leq 0$, such as $-3 \leq a^* \leq 0$, such as $-2 \leq a^* \leq 0$, such as $-1 \leq a^* \leq 0$. In one non-limiting embodiment, the second side of the transparency can have a reflected color within the color space defined by $-5 \leq a^* \leq 0$, such as $-4 \leq a^* \leq -1$, such as $-3 \leq a^* \leq -1$, such as $-3 \leq a^* \leq -2$. In another non-limiting embodiment, the second side of the transparency can have a reflected color within the color space defined by $-7 \leq a^* \leq -2$, such as $-6 \leq a^* \leq -3$, such as $-5 \leq a^* \leq -4$. In a further non-limiting embodiment, the second side of the transparency can have a reflected color within the color space defined by $-3 \leq a^* \leq +2$, such as $-2 \leq a^* \leq +1$, such as $-2 \leq a^* \leq 0$, such as $-1 \leq a^* \leq 0$.

In one non-limiting embodiment, the second side of the transparency can have a reflected color within the color space defined by b* in the range of $-40 \leq b^* \leq -2$, such as $-30 \leq b^* \leq -5$, such as $-25 \leq b^* \leq -7$. In one non-limiting embodiment, the second side of the transparency can have a reflected color within the color space defined by $-11 \leq b^* \leq -5$, such as $-10 \leq b^* \leq -6$, such as $-10 \leq b^* \leq -7$, such as $-9 \leq b^* \leq -7$, such as $-9 \leq b^* \leq -7$, such as $-8 \leq b^* \leq -7$. In another non-limiting embodiment, the second side of the transparency can have a reflected color within the color space defined by $-15 \leq b^* \leq -10$, such as $-14 \leq b^* \leq -11$, such as $-13 \leq b^* \leq -12$. In a further non-limiting embodiment, the second side of the transparency can have a reflected color within the color space defined by $-25 \leq b^* \leq -19$, such as $-24 \leq b^* \leq -20$, such as $-23 \leq b^* \leq -20$, such as $-23 \leq b^* \leq -21$, such as $-22 \leq b^* \leq -21$.

In one non-limiting embodiment, the first side and/or the second side of the transparency 10 can have an L* for reflected light in the range of $30 \leq L^* \leq 60$, such as $40 \leq L^* \leq 60$, such as $40 \leq L^* \leq 50$, such as L* greater than or equal to 40.

The emissivity of the coatings can be the same or different. In one non-limiting embodiment, the first coating 20 can have an emissivity of less than 0.5, such as less than 0.4, such as less than 0.3. In one particular non-limiting embodiment, the first coating 20 can have an emissivity in the range of greater than 0 to 0.3, such as greater than 0 to 0.25. In one non-limiting embodiment, the second coating 22 can have an emissivity of less than 0.2, such as less than 0.1, such as less than 0.08, such as less than 0.05. In one particular non-limiting embodiment, the second coating 22 can have an emissivity in the range of greater than 0 to 0.1, such as greater than 0 to 0.05.

EXAMPLES

Three transparencies were made in accordance with the invention. In each example, the substrate was a piece of clear glass having a thickness of 3.2 mm. First and second coatings as described above were provided on the substrates. The first coating was applied by a conventional CVD process and the second coating was applied by a conventional MSVD process. The coated transparencies had the following characteristics.

Example 1

The first side of the transparency had an average a* of −2.24 (standard deviation of 1.30), a b* of −13.87 (standard deviation of 0.69), an L* of 41.79 (standard deviation of 0.29), and an emissivity of 0.26 (standard deviation of 0.01).

The second side of the transparency had an average a* of −0.71 (standard deviation of 0.93), a b* of −12.37 (standard deviation of 0.77), an L* of 40.20 (standard deviation of 0.31), and an emissivity of 0.05 (standard deviation of less than 0.01).

Example 2

The first side of the transparency had an average a* of −6.35 (standard deviation of 0.66), a b* of −19.34 (standard deviation of 0.87), an L* of 50.42 (standard deviation of 0.47), and an emissivity of 0.24 (standard deviation of 0.01).

The second side of the transparency had an average a* of −4.84 (standard deviation of 0.29), a b* of −21.76 (standard deviation of 0.43), an L* of 49.85 (standard deviation of 0.48), and an emissivity of 0.05 (standard deviation of 0.01).

Example 3

The first side of the transparency had an average a* of −1.43 (standard deviation of 0.35), a b* of −18.62 (standard deviation of 0.33), an L* of 46.27 (standard deviation of 0.25), and an emissivity of 0.24 (standard deviation of less than 0.01).

The second side of the transparency had an average a* of −0.16 (deviation of 0.24), a b* of −19.48 (deviation of 0.41), an L* of 45.87 (standard deviation of 0.32), and an emissivity of 0.04 (standard deviation of 0.01).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:
1. An oven transparency, comprising:
a plurality of uncoated glass substrates;
a single coated glass substrate having a first major surface and a second major surface;
a first coating having a thickness in the range of 4,000 Å to 5,000 Å provided over at least a portion of the first major surface of the coated glass substrate, the first coating comprising:
a first coating layer comprising a gradient layer comprising silica and tin oxide having a thickness in the range of 1,000 Å to 1,200 Å, where said gradient layer has a continuously changing composition as distance increases from an interface of said gradient layer and said single coated glass substrate; and a second coating layer comprising fluorine doped tin oxide having a thickness in the range of 3,000 Å to 4,000 Å; and a second coating provided over at least a portion of the second major surface, of the coated glass substrate the second coating comprising:

a first dielectric layer having a thickness less than or equal to 500 Å comprising a zinc stannate layer and a zinc oxide layer;

a first metallic layer having a thickness in the range of 70 Å to 110 Å over the first dielectric layer;

a second dielectric layer having a thickness in the range of 500 Å to 1,000 Å over the first metallic layer and comprising a first zinc oxide layer, a zinc stannate layer, and a second zinc oxide layer;

a second metallic layer having a thickness in the range of 80 Å to 200 Å over the second dielectric layer; and a topcoat over the second metallic layer consisting of a single layer comprising zinc oxide; and a protective coating over the topcoat, wherein the oven transparency has a transmitted color selected from blue and greenish blue, wherein said first coating defines a first side of said coated glass substrate, and said second coating defines a second side of said coated glass substrate, wherein the first side has a reflected color defined by $-10 \leq a^* \leq 0$ and $-30 \leq b^* \leq -5$, wherein the second side has a reflected color defined by $-10 \leq a^* \leq 0$ and $-30 \leq b^* -5$, and wherein at least one of the first side and the second side has an L* greater than or equal to 40.

2. The oven transparency of claim 1, wherein the protective coating comprises 15 wt. % to 70 wt. % alumina and 85 wt. % to 30 wt. % silica.

3. The oven transparency of claim 1, wherein the protective coating comprises a first layer and a second layer formed over the first layer, wherein the first layer comprises 50 wt. % to 100 wt. % alumina and 50 wt. % to 0 wt. % silica, and the second layer comprises a mixture of silica and alumina.

4. The oven transparency of claim 1, wherein said topcoat has a thickness of from 40 Å to 500 Å.

5. The oven transparency of claim 1, wherein for the second dielectric layer the zinc stannate film is deposited over the first zinc oxide film, and the second zinc oxide film is deposited over the zinc stannate film.

6. The oven transparency of claim 1, wherein said second coating layer has a thickness in the range of 3,500 Å to 4,000 Å.

* * * * *